United States Patent [19]

Hagemann

[11] 4,184,210
[45] Jan. 15, 1980

[54] SONIC ECHO SCANNING AND FACSIMILE RECORDING OF WATER SUBMERGED SURFACES

[76] Inventor: Julius Hagemann, 412 S. MacArthur Ave., Panama City, Fla. 32401

[21] Appl. No.: 759,105

[22] Filed: Sep. 4, 1958

[51] Int. Cl.² ............................. G01S 9/66; G01S 7/60
[52] U.S. Cl. ........................................ 367/88; 367/106; 367/115; 367/11; 346/33 EC
[58] Field of Search ................... 340/2, 3, 174 S, 3 R, 340/3 F, 3 C, 3 T; 346/33 EC, 33 MAG, 33 RAD, 74 MAG, 33 B, 33 MCR; 179/15.55

[56] References Cited

U.S. PATENT DOCUMENTS

| | | | |
|---|---|---|---|
| 2,026,330 | 12/1935 | Tauschek | 346/33 |
| 2,170,751 | 8/1939 | Gabrilovitch | 179/15.55 |
| 2,378,389 | 6/1945 | Begun | 346/33 |
| 2,418,846 | 4/1947 | Meacham | 340/2 |
| 2,506,149 | 5/1950 | Herzog | 346/33 |
| 2,737,646 | 3/1956 | Muffly | 346/74 |
| 2,972,131 | 2/1961 | Dirks | 346/74 |
| 2,974,312 | 3/1961 | Ridler | 346/74 |
| 2,982,923 | 5/1961 | Hibbard | 179/100.2 |
| 2,986,722 | 5/1961 | Williams | 346/74 |
| 2,995,725 | 8/1961 | Kliever | 340/3 |
| 3,005,973 | 10/1961 | Kietz | 340/3 |

FOREIGN PATENT DOCUMENTS 202622  1/1924  United Kingdom ................. 179/100.2

*Primary Examiner*—Richard A. Farley
*Attorney, Agent, or Firm*—W. O. Quesenberry; Rolla N. Carter

EXEMPLARY CLAIM

1. In a sonic echo system for classifying objects proud on the ocean floor in which a submarine vehicle moves through the ocean at a constant height above the ocean floor, scanning means for simultaneously deriving separate electric signals corresponding to the sonic reflecting values of parallel strips of the ocean floor extending athwartships of said vehicle, means for simultaneously storing said separate signals on a record medium, and means for serially reproducing the stored signals.

4 Claims, 3 Drawing Figures

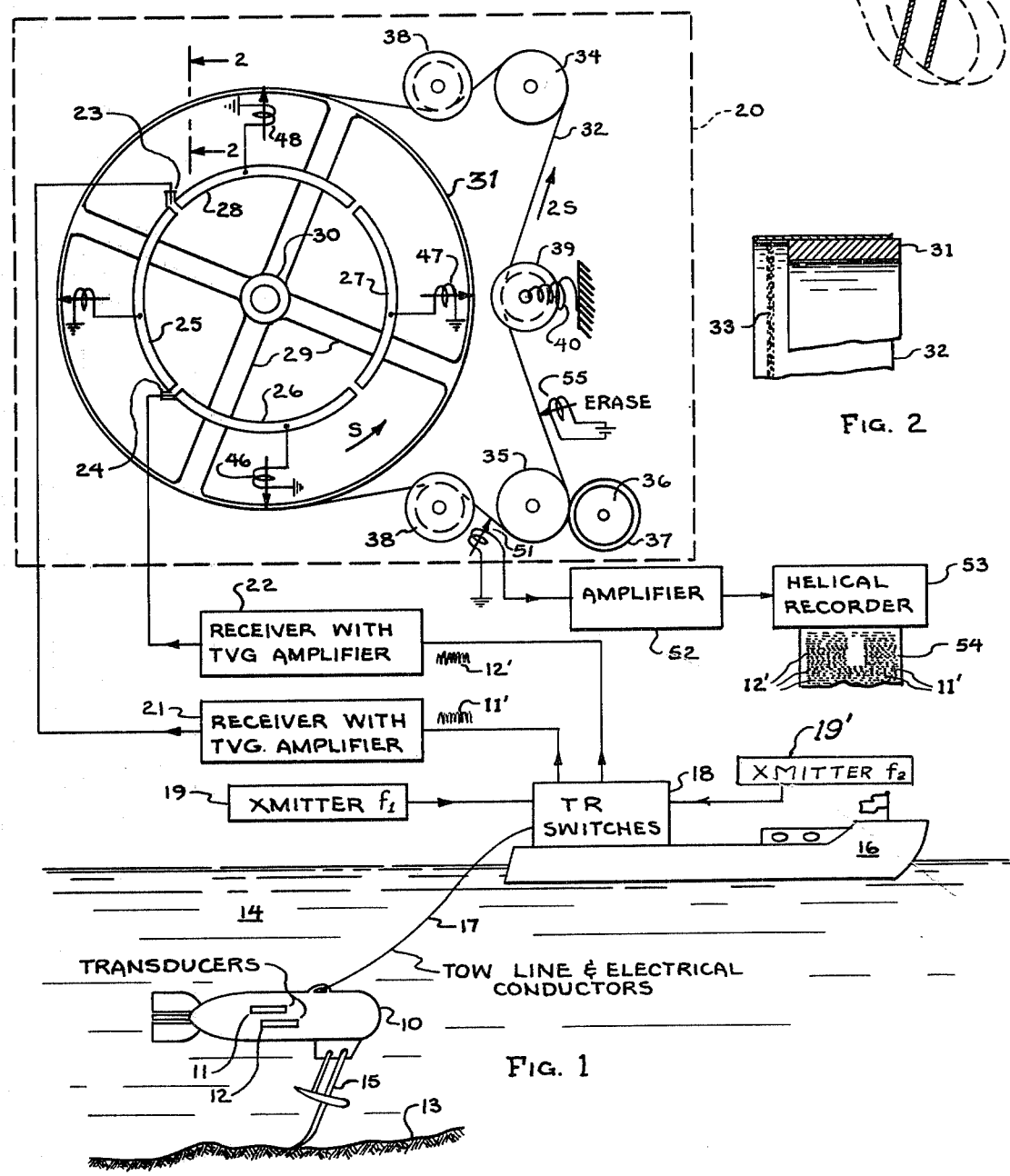

4,184,210

SONIC ECHO SCANNING AND FACSIMILE RECORDING OF WATER SUBMERGED SURFACES

The invention described herein may be manufactured and used by or for the Government of the United States of America for governmental purposes without the payment of any royalties thereon or therefor.

The present invention relates to electroacoustic systems of the type in which a surface is scanned to derive electrical signals corresponding to the sonic reflecting properties of elemental areas of the surface along a line being scanned and more particularly to such a system for producing a facsimile of the sonic echo values of a water submerged surface as viewed obliquely from a line of positions extending parallel to and at a preselected distance above the surface being scanned.

The invention also relates to information recording apparatus and more particularly to recording apparatus adapted to accept separate signal trains in parallel and record them in series.

The invention is specially adapted to apparatus of the type in which signals simultaneously derived from two or more coordinated scanning systems are utilized serially to energize a line by line display device, for example, a helical recorder. Although not limited thereto the invention is specially devised for increasing the towing speed of the ocean bottom surveying system described in my application Ser. No. 753,166 filed Aug. 4, 1958 for Facsimile Recording of Sonic Values of the Ocean Bottom. In the system described in said pending application a sonic scanning system is towed through a seaway at a substantially constant height above the bottom and so constructed that it scans in rapid succession parallel strips of the sea bottom extending athwartships of the direction of tow, the arrangement being that a short pulse of sonic energy in the shape of a vertically oriented fan is directed outwardly and the sonic echoes reflected by the sea bottom are received and displayed in legible form such as on a recording medium or the surface of a cathode ray tube, the definition of the scanning system being determined by the length in water of the sonic pulse and the thickness of the fan shape beam. The transducer employed may be focused to have a resolution in azimuth, i.e., the thickness of the fan shape beam, of about three inches at twenty-five yards and may be pulsed with a sonic pulse of fifty microseconds which has a length in water of about three inches. Thus with a repetition rate of twenty-five per second and a towing speed of four knots the center lines of successive strips along the sea bottom scanned by the apparatus will be spaced approximately three inches.

With the apparatus of the present invention the same overall resolution from the scanning system may be retained while greatly increasing the speed at which the scanning system is moved through the seaway and in the embodiment to be described in detail the towing speed may be doubled.

The primary object of the invention is to present a visual indication of the size, shape and location of objects proud on a sea bottom.

Another object of the invention is to provide apparatus with which two or more simultaneous signals are converted to sequential signals.

In accordance with the invention at least two sonic scanning systems of the type described in my above indentified pending application are spaced in the direction of tow by the distance desired between the adjacent scanned lines, the tow speed is correlated with the scanning rate so that the vehicle in which the scanning systems are mounted is advanced during each complete scanning cycle a distance equal to twice the separation between the two scanning systems. In an idealized version the two scanning systems would comprise a transmitting transducer having a slightly focused beam and two very sharply focused receiver transducers for width of line definition and movement of the scanning systems during a scanning cycle would introduce no ill effects, however such transducers are so expensive that such an ideal system is not presently practicable and it is simpler to employ different frequencies in the two scanning systems. In either event the more sharply focused the transmitting and receiving transducers the greater becomes the effect of the motion of the scanning systems during a scanning cycle and such influence may be compensated or rather eliminated by directing the transmitted pulse forwardly with respect to the receiving transducer by a small angle which is a function of the speed of tow so that the reflected sound from the bottom always appears to the receiving transducer to originate on its axis. If instead of using separate transmitting and receiving transducers transmit-receive transducers are employed, this same angle effect can be introduced by using tapered phase delay lines to the transducer elements during transmission or reception to introduce the desired tilt. The use of tapered phased lines for electrically tilting transducers is well known.

The invention itself, as well as other objects and advantages, will be understood from the following description of the accompanying drawing in which:

FIG. 1 shows diagrammatically one suitable apparatus for practicing the invention;

FIG. 2 is a section along line 2—2 in FIG. 1; and

FIG. 3 shows schematically the operating components of a complete apparatus.

Referring now to FIG. 1 there is shown a towable submarine vehicle or fish 10 provided with scanning transducers 11 and 12 and adapted to maintain itself at a constant distance above the bottom 13 of a body of water or seaway 14 by any suitable means here shown as comprising a depth regulating mechanism 15 such as is described in detail in my U.S. Pat. No. 2,823,635 which issued Feb. 18, 1958. The vehicle 10 is shown being towed through the seaway 14 by a surface vessel 16 by means of a tow line 17 which preferably is provided with insulated electrical conductors for connecting the transducers 11 and 12 to the ship-borne portion of the apparatus which includes transmit-receive switches 18 which in a well known manner periodically connect transmitters 19 and 19' to the transducers 11 and 12, respectively, for transmitting sonic pulses of frequencies $f_1$ and $f_2$, respectively, and connects the transducers 11 and 12 to receivers 21 and 22, respectively, for processing the sonic echo signals derived by the transducers 11 and 12 from sonic energy reflected from the sea bottom 13. The signal trains 11' and 12' indicate the signals derived by the transducers 11 and 12 during one receiving cycle. The receivers 21 and 22 are designed to pass selectively the signal frequencies $f_1$ and $f_2$, respectively, and are preferably provided with time varied gain amplifiers for processing the received signals at substantially a desired average level so that the display system will record ordinary bottom reflections or reverberations.

The two transducer arrays 11 and 12 are arranged such that their two lines of focus along the sea bottom 13 are parallel and spaced apart by the desired line definition, for example, three inches. When the two transducers 11 and 12 are pulsed simultaneously the echoes they receive produce in two separate channels 21 and 22 two sets of signals 11' and 12' which are representative of two simultaneous scanning lines having a separation of three inches. In accordance with the invention these two simultaneous signals are fed in parallel to a mnemonic device in such a manner that they can be retrieved serially, the arrangement being such that the resulting series of signals will correspond to what would have been obtained from a single transducer operating at a repetition rate of twice the actual rate of the dual beam system. Any suitable electrical or magnetic mnemonic device may be employed for the temporary storage of the two sets of signals, but for the purpose of explaining the principal of the invention a system utilizing a magnetic memory will be described.

The outputs of the receivers 21 and 22 are connected, respectively, to brushes 23 and 24 positioned to ride on commutator segments 25, 26, 27 and 28 mounted on spokes 29 radiating from a hub 30 and supporting at their outer ends a cylindrical rim 31 having a highly polished peripheral surface. An endless tape 32 provided with a magnetic record track 33 is trained over at least 180° of the rim 31 with the magnetic track 33 overhanging the rim as shown in FIG. 2. The tape 32 is also trained over idler rollers 34 and 35 and is adapted to be driven by drive roller 36 which may be provided with a rubber surface 37. Flanged idler rollers 38 serve to guide the tape 32 over the rim 31 and a flanged idler roller 39 biased by a spring 40 serves to maintain the tape 32 under the desired tension. For the purpose hereinafter pointed out and by any suitable means (not shown) the tape supporting rim 31 is rotated in the direction of the arrow at a surface speed S and the tape driving roller 36 is rotated to advance the tape 32 in the direction indicated by an arrow at a speed 2S, i.e., the tape 32 moves over the rim 31 in the direction of rotation of the rim 31 and at a greater speed so that the relative movement of the tape 32 with respect to the surface of the rim 31 is at the speed S. Each of the commutator quadrants 25, 26, 27 and 28 have electrically connected thereto recording heads 45, 46, 47 and 48, respectively, which are suitably supported for rotation in fixed relation with the rim 31 and in position to record on the magnetic track 33. At some convenient position such as after the tape 32 leaves the rim 31 there is positioned a pickup device 51 the output of which is fed through an amplifier 52 to a facsimile recording apparatus here shown as being a helical recorder 53 which marks a recording medium 54 in accordance with the signal trains 11' and 12' as indicated. Between the pickup head 51 and where the tape 32 is again trained over the recording rim 31 an eraser head 55 is provided.

The overall functioning of the system above described in connection with FIGS. 1 and 2 can be readily visualized from the diagrammatic showing in FIG. 3 which differs therefrom only in that a single transmitter 19 is indicated.

In operating the system shown in FIG. 1 the tape 32 is moved counterclockwise at a speed corresponding to the length of two quadrants of the cylindrical rim 31 per sweep or scan of the sonic scanning systems and the rim 31 in assembly with its commutator quadrants and recording heads is rotated counterclockwise at a speed of one quadrant per sweep or scan. With this arrangement it is evident that the relative speed between the tape 32 and a cooperating recording head is equal to the circumferential length of one quadrant of the rim 31 per sweep whereas the playback speed at the pickup 51 is twice that value, i.e., the actual speed of the tape 32. When thus operated the respective outputs of the two receiver channels 21 and 22 appearing on the brushes 23 and 24 will via the cooperating commutator segments be simultaneously recorded on sequential segments of the tape 32 and will be sequentially, i.e., serially, reproduced at the pickup 51 at double the recording speed. The signals reproduced by the pickup 51 are utilized to provide the desired presentation such as to actuate a facsimile recorder as shown or as described in my above identified pending application to control a display on the face of a cathode ray tube. It will, of course, be understood that the TR switches 18 and the recorder 53 are operated in proper time relation with the rotation of the recording heads on the rim 31 and the advance of the tape 32 by well known techniques, a suitable one being described in my above identified pending application and are not illustrated since to do so would tend to obscure rather than clarify the invention.

While for the purpose of disclosing the invention a particular apparatus has been described in detail it will be evident to those skilled in the art that many modifications may be made within the scope of the invention as defined by the appended claims.

What is claimed is:

1. In a sonic echo system for classifying objects proud on the ocean floor in which a submarine vehicle moves through the ocean at a constant height above the ocean floor, scanning means for simultaneously deriving separate electric signals corresponding to the sonic reflecting values of parallel strips of the ocean floor extending athwartships of said vehicle, means for simultaneously storing said separate signals on a record medium, and means for serially reproducing the stored signals.

2. A sonic echo system in accordance with claim 1 in which said storing means includes a strip recording medium, and said reproducing means includes pickup transducer means for continuously scanning the strip recording medium, and means fed by said scanning transducer for marking a recording medium in accordance with the information contained in said stored signals.

3. A system in accordance with claim 2 and wherein the signal storing means comprises a cylindrical drum adapted to be rotated about its axis at a given peripheral speed, an endless loop of magnetic tape trained over at least 180° of the circumference of said drum and adapted to be advanced in the direction of the drum's rotation at twice the peripheral speed of said drum, four recording heads rotatable with and equally angularly spaced about said drum in recording relation with a tape trained thereover, a commutator carried by said drum and having four 90° segments individual, respectively, to and in electrical connection with the four recording heads, two stationary brushes in contact with and angularly spaced 90° about the commutator so that each recording head is connected to one or the other of said brushes during the time it traverses a 180° arc of said tape while it is trained over said drum, and means for feeding said separate signals to separate ones of said brushes.

4. Facsimile apparatus comprising electroacoustic means for scanning on an elemental-area basis two adjacent parallel strips of a sea bottom and developing separate electric signals corresponding to the two scansions, means for simultaneously recording the separate signals along sequential segments of a linear recording medium comprising two recording heads spaced apart a distance equal to the length of the said segments, means for advancing the recording medium at a given speed in one direction, means for advancing said two recording heads in said one direction and in recording relation with said recording medium, means for separately energizing said two recording heads with said two developed signals, a pickup head positioned to scan the signals recorded on said recording medium and a facsimile recorder connected to said pickup head for marking a record medium in accordance with the signals derived by said pickup head.

* * * * *